US011072550B2

(12) United States Patent
    Hodgkinson

(10) Patent No.: US 11,072,550 B2
(45) Date of Patent: Jul. 27, 2021

(54) MEMBRANE SEPARATION PROCESS

(71) Applicant: CENTRAL GIPPSLAND REGION WATER CORPORATION, Traralgon (AU)

(72) Inventor: Andrew Hodgkinson, Traralgon (AU)

(73) Assignee: Central Gippsland Region Water Corporation, Traralgon (AU)

( * ) Notice: Subject to any disclaimer, the term of this patent is extended or adjusted under 35 U.S.C. 154(b) by 143 days.

(21) Appl. No.: 16/067,626

(22) PCT Filed: Jan. 6, 2017

(86) PCT No.: PCT/AU2017/050011
    § 371 (c)(1),
    (2) Date: Jul. 2, 2018

(87) PCT Pub. No.: WO2017/117632
    PCT Pub. Date: Jul. 13, 2017

(65) Prior Publication Data
    US 2019/0010070 A1    Jan. 10, 2019

(30) Foreign Application Priority Data

Jan. 7, 2016    (AU) .................... 2016900045

(51) Int. Cl.
    *B01D 61/22*    (2006.01)
    *B01D 65/08*    (2006.01)
    (Continued)

(52) U.S. Cl.
    CPC .............. *C02F 9/00* (2013.01); *B01D 61/025* (2013.01); *B01D 61/027* (2013.01);
    (Continued)

(58) Field of Classification Search
    CPC ........ B01D 29/00; B01D 29/01; B01D 29/05; B01D 37/04; B01D 61/00; B01D 61/002;
    (Continued)

(56) References Cited

U.S. PATENT DOCUMENTS 3,110,667 A    11/1963   Stuppy
    3,992,301 A *  11/1976   Shippey ................. B01D 61/30
                                                        210/636
    (Continued)

FOREIGN PATENT DOCUMENTS

CN    1772649 A    5/2006
    CN    2910906 Y    6/2007
    (Continued)

OTHER PUBLICATIONS

Bartels et al., Chemically Tolerant NF Membranes for Aggressive Industrial Applications; Paper published for a presentation given by Hydronautics, pp. 1-37, 2006, Oceanside, California.
    (Continued)

*Primary Examiner* — Joseph W Drodge
(74) *Attorney, Agent, or Firm* — Ballard Spahr LLP

(57) ABSTRACT

A membrane separation process is described. The process comprises pumping of a fluid stream through a membrane module to produce a permeate during a plurality of membrane operating cycles. Each membrane operating cycle comprises a filtration cycle and a relaxation cycle. Concentration polarisation is controlled during the process by controlling duration of filtration cycles and relaxation cycles to relatively short duration to maintain the degree of concentration polarisation below a target.

11 Claims, 3 Drawing Sheets

(51) Int. Cl.
| | |
|---|---|
| *B01D 61/14* | (2006.01) |
| *C02F 3/12* | (2006.01) |
| *B01D 61/02* | (2006.01) |
| *C02F 1/44* | (2006.01) |
| *C02F 3/28* | (2006.01) |
| *C02F 9/00* | (2006.01) |
| *C02F 3/00* | (2006.01) |
| *B01D 61/16* | (2006.01) |
| *B01D 63/04* | (2006.01) |
| B01D 61/58 | (2006.01) |
| C02F 103/28 | (2006.01) |

(52) U.S. Cl.
CPC ........... *B01D 61/145* (2013.01); *B01D 61/16* (2013.01); *B01D 61/22* (2013.01); *B01D 63/04* (2013.01); *B01D 65/08* (2013.01); *C02F 3/006* (2013.01); *C02F 3/1273* (2013.01); B01D 61/02 (2013.01); B01D 61/58 (2013.01); B01D 2311/04 (2013.01); B01D 2311/06 (2013.01); B01D 2315/06 (2013.01); B01D 2315/20 (2013.01); B01D 2317/02 (2013.01); B01D 2321/02 (2013.01); C02F 1/441 (2013.01); C02F 1/442 (2013.01); C02F 1/444 (2013.01); C02F 3/28 (2013.01); C02F 2103/28 (2013.01); C02F 2201/005 (2013.01); C02F 2209/03 (2013.01); C02F 2303/14 (2013.01); C02F 2303/20 (2013.01); Y02W 10/10 (2015.05)

(58) Field of Classification Search
CPC .... B01D 61/02; B01D 61/022; B01D 61/025; B01D 61/027; B01D 61/08; B01D 61/12; B01D 61/14; B01D 61/145; B01D 61/147; B01D 61/18; B01D 61/22; B01D 61/58; B01D 63/00; B01D 2311/00; B01D 2311/22; B01D 2311/25; B01D 2315/18; B01D 2315/20; B01D 65/02; B01D 65/08; B01D 2315/06; B01D 2321/02; B01D 2317/02; C02F 1/00; C02F 1/001; C02F 1/008; C02F 1/32; C02F 1/325; C02F 1/505; C02F 1/78; C02F 1/44; C02F 1/441; C02F 1/442; C02F 1/444; C02F 1/445; C02F 2209/00; C02F 2209/001; C02F 2209/003; C02F 2209/005; C02F 9/005; C02F 3/006; C02F 3/06; C02F 3/1268; C02F 3/1273; C02F 3/28; C02F 2201/005; Y02W 10/10
USPC ........... 210/767, 790, 138, 141, 143, 321.6, 210/321.72, 348, 500.1, 500.21, 650, 636
See application file for complete search history.

(56) References Cited

U.S. PATENT DOCUMENTS

| | | |
|---|---|---|
| 4,473,474 A | 9/1984 | Ostreicher et al. |
| RE31,952 E | 7/1985 | Wilcox et al. |
| 5,200,089 A | 4/1993 | Siefert et al. |
| 5,529,697 A | 6/1996 | Braasch et al. |
| 5,958,243 A * | 9/1999 | Lawrence ............. B01D 61/20 210/137 |
| 6,033,568 A | 3/2000 | Kaplan |
| 6,463,790 B1 | 10/2002 | Chun et al. |
| 6,896,806 B2 | 5/2005 | Kumar et al. |
| 7,459,083 B1 | 12/2008 | Hong et al. |
| 8,336,292 B2 | 12/2012 | Bloms et al. |
| 8,741,143 B2 | 6/2014 | Evans et al. |
| 9,610,541 B2* | 4/2017 | Hodgkinson .......... B01D 65/10 |
| 2002/0153303 A1 | 10/2002 | Oswald et al. |
| 2003/0141250 A1 | 7/2003 | Kihara et al. |
| 2004/0140266 A1 | 7/2004 | Nguyen et al. |
| 2004/0222158 A1 | 11/2004 | Husain et al. |
| 2004/0266017 A1* | 12/2004 | Chun .................... B01D 61/22 436/151 |
| 2006/0060525 A1 | 3/2006 | Hoffland |
| 2007/0039888 A1* | 2/2007 | Ginzburg .............. B01D 65/08 210/650 |
| 2007/0039895 A1 | 2/2007 | Sengupta et al. |
| 2007/0095754 A1 | 5/2007 | Livingston et al. |
| 2008/0163698 A1 | 7/2008 | Ogawa et al. |
| 2008/0277340 A1* | 11/2008 | Hong .................... B01D 61/22 210/620 |
| 2009/0001018 A1* | 1/2009 | Zha ....................... B01D 61/22 210/636 |
| 2010/0044310 A1 | 2/2010 | Wan et al. |
| 2010/0264080 A1* | 10/2010 | Livingston ............ C02F 3/1289 210/605 |
| 2010/0300968 A1 | 12/2010 | Liu et al. |
| 2011/0067737 A1* | 3/2011 | Sun ....................... B01D 61/18 134/34 |
| 2011/0180487 A1 | 7/2011 | Manic et al. |
| 2011/0272335 A1* | 11/2011 | Cote ...................... B01D 65/08 210/150 |
| 2012/0061333 A1* | 3/2012 | Zha ........................ C02F 1/001 210/797 |
| 2012/0285885 A1* | 11/2012 | James ................... B01D 63/02 210/636 |
| 2013/0001162 A1* | 1/2013 | Yangali-Quintanilla .................... C02F 1/445 210/636 |
| 2013/0043183 A1 | 2/2013 | Ge et al. |
| 2014/0158618 A1 | 6/2014 | Zha et al. |
| 2014/0318219 A1 | 10/2014 | Hodgkinson et al. |
| 2015/0053610 A1* | 2/2015 | Diallo ................ B01D 67/0079 210/500.23 |
| 2016/0046503 A1* | 2/2016 | Hoek ...................... C02F 1/008 210/636 |

FOREIGN PATENT DOCUMENTS

| | | |
|---|---|---|
| CN | 200978232 Y | 11/2007 |
| CN | 101088941 A | 12/2007 |
| CN | 101249992 A | 8/2008 |
| DE | 10004590 A1 | 5/2001 |
| EP | 0855212 A1 | 7/1998 |
| EP | 1614661 A1 | 1/2006 |
| EP | 1734013 A2 | 12/2006 |
| GB | 2394678 A | 5/2004 |
| KR | 20070118055 A | 12/2007 |
| WO | 9208783 A1 | 5/1992 |
| WO | 9916714 A1 | 4/1999 |
| WO | 2005123603 A1 | 12/2005 |

OTHER PUBLICATIONS

Ostarcevic, Colour Removal Without Chemical Addition Using Nanofiltration, 69th Annual Water Industry Engineers and Opwerators' Conference Exhibition Center, Bendigo, Sep. 5-7.

Bae et al., Lifetime Prediction of a Polymer Electrolyte Membrane Fuel Cell Via an Accelerated Startup—Shutdown Cycle Test, International Journal of Hydrogen Energy, 37, 2012, pp. 9775-9781.

Zondervan et al., Statistical Analysis of Data from Accelerated Ageing Tests of PES UF Membranes; Journal of Membrane Science, vol. 300, 2007, ages 11-116.

* cited by examiner

MEMBRANE SEPARATION PROCESS

CROSS REFERENCE TO RELATED APPLICATIONS

This application is a U.S. National Phase Application of International Patent Application No. PCT/AU2017/050011, filed Jan. 6, 2017, which claims priority to Australian Patent Application No. 2016900045, filed Jan. 7, 2016, both of which are herein incorporated by reference in their entireties.

FIELD OF THE INVENTION

This invention relates to a membrane separation process.

BACKGROUND TO THE INVENTION

Membrane processes are commonly used in industry for separating components from fluid mixtures, whether the fluid is in liquid or gaseous form. Membranes of semi-permeable material enable separation of components as follows. Some components of the fluid mixture permeate through the membrane, though at different rates. Other components will not pass through the membrane at all, or only very slowly. Such components are said to be retained, or rejected, by the membrane.

In the field of water and wastewater treatment, for example, membrane processes may be used to purify an "effluent" water stream containing water in admixture with contaminant components. Such industrial processes involve membrane separation of the contaminant components or chemical or biological derivatives thereof from the effluent water, allowing the treated water to be re-used for beneficial purposes or discharged safely into the environment. An example of such a process, advantageously involving a sequence of membrane separation processes (ultrafiltration, nanofiltration then reverse osmosis) is disclosed in the Applicant's WO 2010037156 "Process and Plant for Treating a Water Stream". Membrane processes may be used to achieve separation of substances in many applications and process media including water treatment for desalination, filtration and in membrane bioreactors, which are a specialised type of filtration application incorporating an integrated biological digestion process.

Industrial application of membrane processes such as disclosed in WO 2010037156, requires suitable equipment in the form of membrane modules for which various designs are available: hollow fibre, tubular, spiral wound and—less commonly plate and frame. Hollow fibre membrane modules are often preferred because hollow fibre membranes allow the highest membrane surface area per unit volume of a vessel to accommodate them. A hollow fibre membrane module typically comprises a bundle of the hollow membrane fibres sometimes accommodated within a pressurisable housing or immersed in an open tank configuration. A hollow fibre bundle extends between two opposed headers or "pots" forming part of the module housing and the opposite ends of each hollow fibre are potted and sealed within each "pot", typically of polymer or resin material (particularly epoxy or polyurethane resin), to form a tube sheet. The resulting design is reminiscent of a shell and tube heat exchanger. The fluid to be treated is contacted with the hollow fibres such that components are separated, with liquid generally passing inwards (permeating) to the hollow centre of the fibre under the action of a moderate pressure gradient, and the solids remaining outside the fibre.

Membrane separation processes often include a number of membrane modules, of whatever construction, operating in parallel. A number of such modules may comprise a rack or gang, which is located, either in a pressurised system or submerged in a tank style water treatment cell to which water for treatment has been introduced to remove contaminants from the water, for example in a membrane bioreactor. A number of such water treatment cells would be included in the typical membrane separation plant. Each water treatment cell, particularly in an aerobic membrane bio-reactor, may be agitated by sparging air through it. Liquid flow may also be recirculated through each water treatment cell. Such agitation and or recirculation is used to control solids build-up on, and surface fouling of, membranes that otherwise impedes liquid access to the membrane surface and hence reduces ease of permeation and overall membrane treatment performance.

Conventional membrane separation processes are also likely to involve air scouring phases when cross-flow movement of air and water across membrane surfaces is deliberately induced to cause shear events (caused by gas bubbles for example) or sufficient cross-flow or bubble agitation to cause solid particles to move away from the membrane surface. Air scouring is energy intensive and therefore can be costly.

Whatever precautions are taken to control surface fouling in membrane systems, the problem of surface fouling—a form of concentration polarisation cannot be completely avoided by current systems. In this instance, filtration performance is impeded in a manner similar to concentration polarisation when the mass of particles being filtered from the liquid (whether water or otherwise), containing a high proportion of fine particles crowds around the membrane surface, retarding the ease of flow of the filtrate through the membrane barrier. This problem is most severe with very fine particles, which are able to pack most closely together forming a more complete barrier to flow. Very fine particles can proliferate for a wide range of reasons, for instance due to natural prevalence, or in a membrane bio-reactor (such as used for water treatment at Gippsland Water Factory and elsewhere), due to biological growth conditions that sometimes lead to proliferation (or a bloom) in ultrafine particle population. Microflora which may proliferate or bloom in this way include bacteria and algae. Typically, the microflora exists in mixed populations and particle sizes of many different species, all of which may together be referred to as a "biological consortium".

Many membrane bio-reactors develop such fine particles, partly intentionally since the microflora assist in the water treatment process, so membrane bio-reactor managers manage the biological consortium in such a way as to keep the fraction of the finest particles quite small. As the particles collect at membrane surfaces during ultrafiltration (or other membrane processes subject to the same issue), the larger particles (which may actually consist of coagulates of smaller particles) help to prevent the smaller particles, specifically those which are floating freely, from crowding too closely at the membrane surface. If this happens successfully, the driving pressure or trans membrane pressure (TMP) needed to establish and maintain the desired flux through the membrane can remain within the desired limits.

Such control strategies cannot generally be relied upon as the sole mechanism for preventing membrane surface fouling, that is, the clustering of filtered solids near the membrane surface, likened to concentration polarisation. If too many fine particles gather at the membrane surface, some of the fine particles will become either temporarily or permanently stuck to the membrane surfaces. When the membrane surfaces become too fouled, or dirty, and flux cannot be maintained due to TMP reaching a maximum acceptable pressure, the membranes must be cleaned, generally by applying cleaning chemicals. Such cleaning chemicals are a significant cost to the membrane separation plant. In extreme cases, the membranes become irreversibly fouled and must be replaced, reducing availability in the membrane processing plant and associated replacement costs.

Concentration polarisation reducing membrane flux may also occur without membrane surfaces permanently fouling with fine solids. Again, the problem is most severe in ultra-filtration systems, and this is a key reason why ultra filtration systems adopt an intermittent flow relaxation and in some cases intermittent reverse pulse of either air or filtrate. Typically this entails a filtration cycle time of, say, 12 minutes, followed by a 1 minute relaxation (no filtration and no applied pressure). This cycle is then repeated until, after a period of perhaps several weeks or even months, the membrane requires aggressive chemical cleaning to restore it to optimum clean and operational condition again.

However, this operating arrangement requires operators to maintain relatively modest flux conditions. If the maximum permissible driving force (hydraulic pressure) were to be applied to a relatively clean membrane, maximum potential flux is often two to three times greater than that which can be sustainably maintained without causing rapid fouling. High flux is generally desirable from an economic perspective since the higher the flux, the less membrane area and associated equipment is required to process a given amount of flow.

However, such very high flux conditions are not sustainable with the current art because if a high flux is imposed, fine particles will rapidly accumulate around each fibre. If the high flux is maintained, the membrane will soon become fouled, and possibly so heavily fouled that it cannot be cleaned. Thus concentration polarisation, which is a predictable consequence of high flux conditions, is a direct obstacle to operation at high flux, which is an otherwise desirable performance objective.

It is an object of the present invention to provide a membrane separation process enabling improved control over concentration polarisation.

SUMMARY OF THE INVENTION

With this object in view, the present invention provides a membrane separation process comprising pumping of a fluid stream through a membrane module to produce a permeate during a plurality of membrane operating cycles, each membrane operating cycle comprising a filtration cycle and a relaxation cycle wherein concentration polarisation is controlled during the process by controlling duration of filtration cycles and relaxation cycles to relatively short duration to maintain the degree of concentration polarisation below a target.

The process is well adapted to controlling concentration polarisation in an ultra-filtration application where concentration polarisation issues have generally been found most severe, such as in membrane bio reactors processing industrial wastewater. However, the process may also be applied in different membrane separations.

Degree of concentration polarisation may be measured in different ways. A target for degree of concentration polarisation may be set according to acceptable permeate flux in a constant pressure operation or acceptable trans membrane pressure (TMP) in a constant permeate flux operation. Acceptability is judged according to the requirements of the specific membrane separation process.

Concentration polarisation may also be measured by reference to accumulation of solids on membrane surfaces. Solids accumulation is controlled in the process so as to maintain the required permeate flux and TMP targets. In such case, duration of filtration and relaxation cycles is desirably set by reference to solids accumulation, as measured by thickness of the surface layer or a proxy measure, such as TMP or permeate flux, or gross solids load accumulated on an entire rack of membrane modules.

Durations for filtration and relaxation cycles may be the same or different. Durations for filtration and relaxation cycles are advantageously set to be very substantially and unconventionally shorter than in conventional membrane separation processes, particularly those involving water treatment by ultra-filtration, where filtration and relaxation cycle durations in excess of about 9 to 10 minutes, even 14 minutes or above, are commonly adopted. Cycle duration for such water treatment process by ultra-filtration is desirably controlled to be less than 5 minutes, preferably less than 1 minute and most preferably less than 30 seconds, for example 10 seconds. These cycle durations are very substantially and unconventionally shorter than in conventional industrial water ultra-filtration practice.

In essence, when the filtration cycle duration is kept sufficiently brief, the required quantity of clean filtrate can be rapidly extracted through the membrane at a flux approaching the hydraulic capacity of the system before a significant cake layer of solids has accumulated at the membrane surface to begin retarding the filtrate process. If filtration ceases before this accumulation has become established, a brief relaxation period then allows the prevailing agitation and recycle flow to sweep away the liquid and refresh the zone adjacent to the membrane surface with a fresh quantity of un-concentrated liquid. In this way an average net flux much higher than typically maintainable in conventional systems can be sustained.

Filtration and relaxation cycle duration may be varied as effluent water chemical composition or physical characteristics (e.g. solids loadings) change. For example, if solid loadings in fluid streams increase, duration of filtration and relaxation cycle duration may be reduced and vice versa. Changes in chemical composition of the fluid being filtered may also influence the duration of filtration and relaxation cycles.

Permeate is conveniently drawn through the membrane by suction. Such suction is generated by permeate extraction pumps located downstream of the membranes. Conventionally, filtration cycles would proceed whilst permeate extraction pumps are turned "on" to filter a fluid by membrane separation and relaxation cycles would proceed whilst permeate extraction pumps are turned "off". Membrane cleaning operations, such as backwashing or sludge removal operations, may optionally be conducted during relaxation cycles. However, in accordance with the process described here, the durations of filtration and relaxation cycles are so short as to make pump operation a less desirable way for controlling the duration of filtration and relaxation cycles; control over pump operation being less precise for controlling the requisite very short cycle duration than control over valve operation for the same purpose. It is more convenient for the permeate extraction pumps to operate, i.e. run, continuously during membrane operating cycles and for quick or fast acting valves to control filtration and relaxation cycle duration. Actuated valves driven by either electrical solenoids or compressed air pistons are preferred for this purpose as more precise control over the requisite very short cycle duration is possible than when switching pumps on or off.

This does not mean that the usual means of turning filtration pumps on and off is discarded, but rather the present invention adds to this conventional equipment capability an additional means of manipulating filtration and relaxation cycle times.

With the application of the proposed invention, however, the frequency of filtration and relaxation cycles to which a membrane module is subjected to in order to control concentration polarisation should be significantly greater than the frequency of filtration and relaxation cycles used in conventional membrane separation processes. This can induce significant pressure shocks at pumps and valves which conventional membrane system operators would normally take steps to prevent (see, for example, Huisman, I H and Williams, K, Autopsy and failure analysis of ultrafiltration membranes from a waste-water treatment system, Desalination 165 (2004), 161-164)). In contrast, the process described here is intended to purposefully induce such hydraulic pressure shocks to control concentration polarisation and optimise permeate flux and trans membrane pressure (TMP), particularly in the context of a water treatment process.

The membrane module conveniently comprises hollow fibre membranes as such membranes are often selected for industrial membrane separation processes for reasons described above. In this case, the membrane module comprises a housing accommodating a bundle of the hollow membrane fibres, each hollow fibre extending between two opposed headers (also known as pots) with the opposite ends of each hollow fibre being potted and sealed within a header, typically of a polymeric, such as epoxy or polyurethane resin, material. The membrane module may also be selected from other membrane module types such as tubular, spiral wound and, less desirably, plate and frame membrane module types.

The use of such hollow fibre membranes in the membrane separation process described here is counter-intuitive since the very short membrane operating cycles, in comparison with conventional membrane would be thought likely to induce significant cyclic stresses on the membrane fibre terminations (pots) and a higher prospect of failure. However, the benefits achieved by controlling concentration polarisation in terms of higher plant availability and throughput are predicted by the applicant to offset the risk of failure. Risk of failure can be mitigated at least partially by appropriate selection of design and type of membrane module.

Membrane modules, as described above, are conveniently used in membrane bioreactors, especially under submerged conditions. A membrane separation plant conducting the membrane separation process may typically comprise a plurality of cell(s) configured to simulate membrane bioreactor(s) (MBRs) and membrane modules, typically comprising hollow fibre membranes are submerged in mixed liquor in the MBR cell(s). Each MBR cell would typically adopt similar filtration and relaxation cycle durations as determined by a supervising operator and/or appropriately programmed automatic control system. MBR cells may conveniently be in the form of tanks of suitable material. For a large water treatment plant, for example, the cells could be built from suitably painted concrete or like material.

Liquid treatment processes, especially water treatment processes, are a particularly important example of industrial membrane separation process in accordance with the invention. Membrane separation processes are widely used for separation of contaminants from water. The membrane separation process may be used for other applications in which concentration polarisation can be at times sufficiently serious to require control through a membrane operating cycle control strategy.

A further benefit of the system of the present invention resides in that frequent stopping and starting of pumps may not be required when fast acting valves are used to control filtration and relaxation cycle times. In a typical large installation, this may mean that with, for example, 15 racks of modules per cell, and 12 cells (and thus 12 filtrate extraction pumps), each cell might ordinarily stop and start every 12 to 13 minutes. With the system of the present invention, all pumps can remain continuously on and each rack can be cycled individually.

Alternatively, if only a moderate filtrate throughput is required, the facility might revert to conventional filtration mode in which case all fast acting valves can be set to "open" and the more typical 12 minutes on and 1 minute off filtration mode might be adopted.

The present invention also provides a means whereby existing membrane filtration facilities plants can have their potential throughput capacity substantially increased at only moderate cost. The main expense of increasing capacity is installation of a number of fast acting valves and appropriate controls. Thus, substantial increase in throughput can be achieved efficiently and economically instead of a proportionate expansion of filtration cells, pumps, electric, controls and of course more membrane modules. In some instances this saving in equipment, cost and plant footprint may mean the difference between viability and non viability of a desired expansion.

BRIEF DESCRIPTION OF THE DRAWINGS

The membrane separation process is now described with reference to a preferred but non-limiting embodiment used in water treatment. Description of the process refers to the accompanying drawings in which.

DETAILED DESCRIPTION OF AN EMBODIMENT OF THE INVENTION

Figure 1:
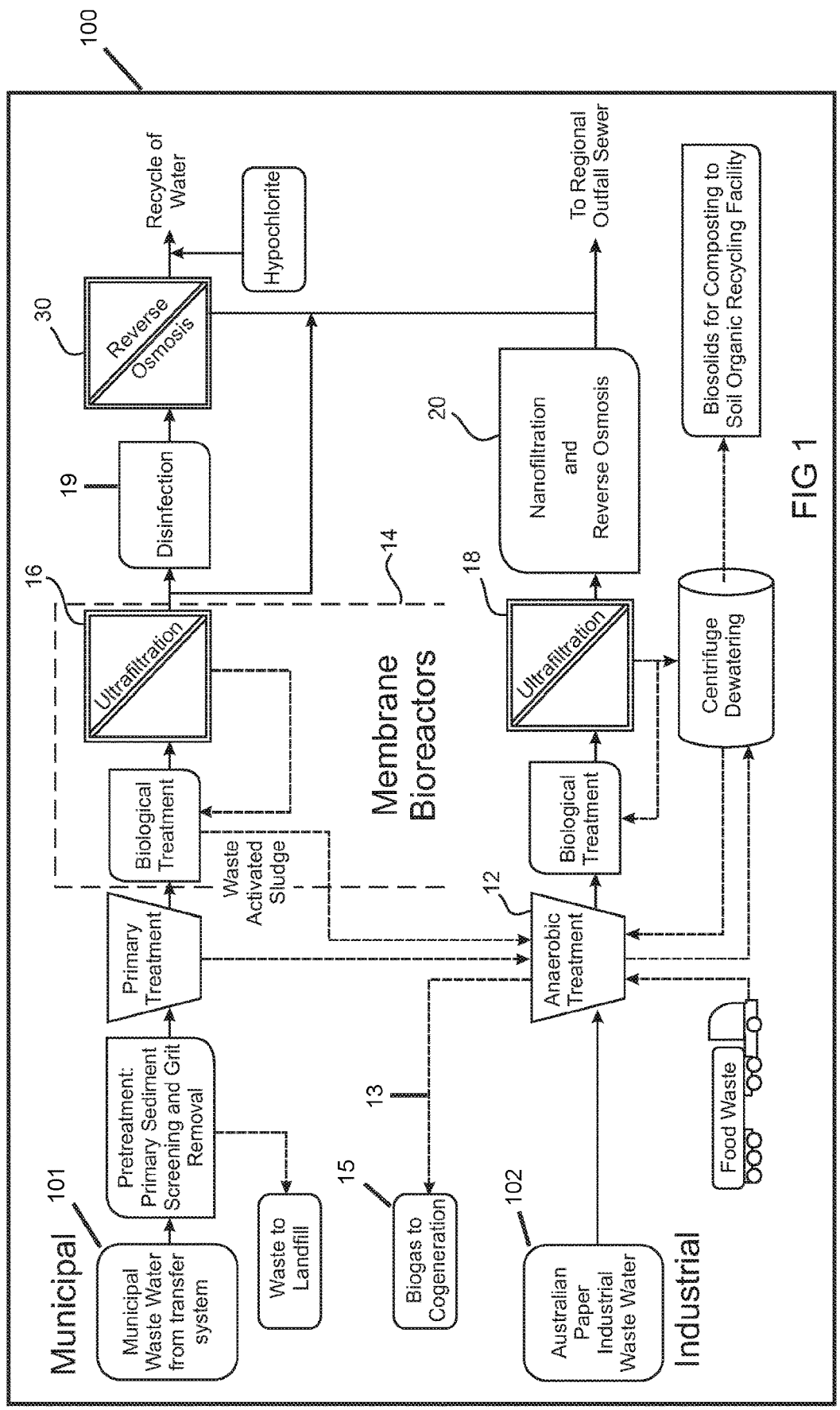
FIG. 1 is a schematic process flowsheet for a water treatment plant operable in accordance with the process of one embodiment of the invention.

Referring now to FIG. 1, there is shown a water treatment plant 100 that processes two distinct influent streams, which in this embodiment is a municipal waste water stream 101 and an industrial waste water stream 102. Stream 102 is received in a system comprising an anaerobic reactor stage 12 to produce treated water and biogas 13, a portion of which may be combusted in a gas engine or turbine 15 to generate electrical power for the plant 100. Water treatment plant 100 treats up to 35 million litres of waste water per day in total. The system supplies pre-treated influent water to a membrane bioreactor ("MBR") system 14 comprising a plurality of membrane bioreactors, each membrane bioreactor forming a discrete sub-system within the MBR system 14 and which treats streams 101 and 102 in segregated flow paths. Raw influent water, which is one or both of domestic effluent 101 and/or industrial effluent 102 such as that received from a Kraft process pulp and paper mill, are received through dedicated waste lines. This effluent or waste water has contaminant components as measured by a high biochemical oxygen demand ("BOD") and dissolved organic carbon ("DOC") content which, in the case of the paper mill waste, provides a strong brown colouration to the waste water.

Stream 101 passes into the MBR system 14 and eventually to ultrafiltration (UF) system 16. After treatment and filtration the purified filtrate is drawn from UF system 16 and passes to the reverse osmosis plant 30, where high quality recycled water is produced.

Figure 2:
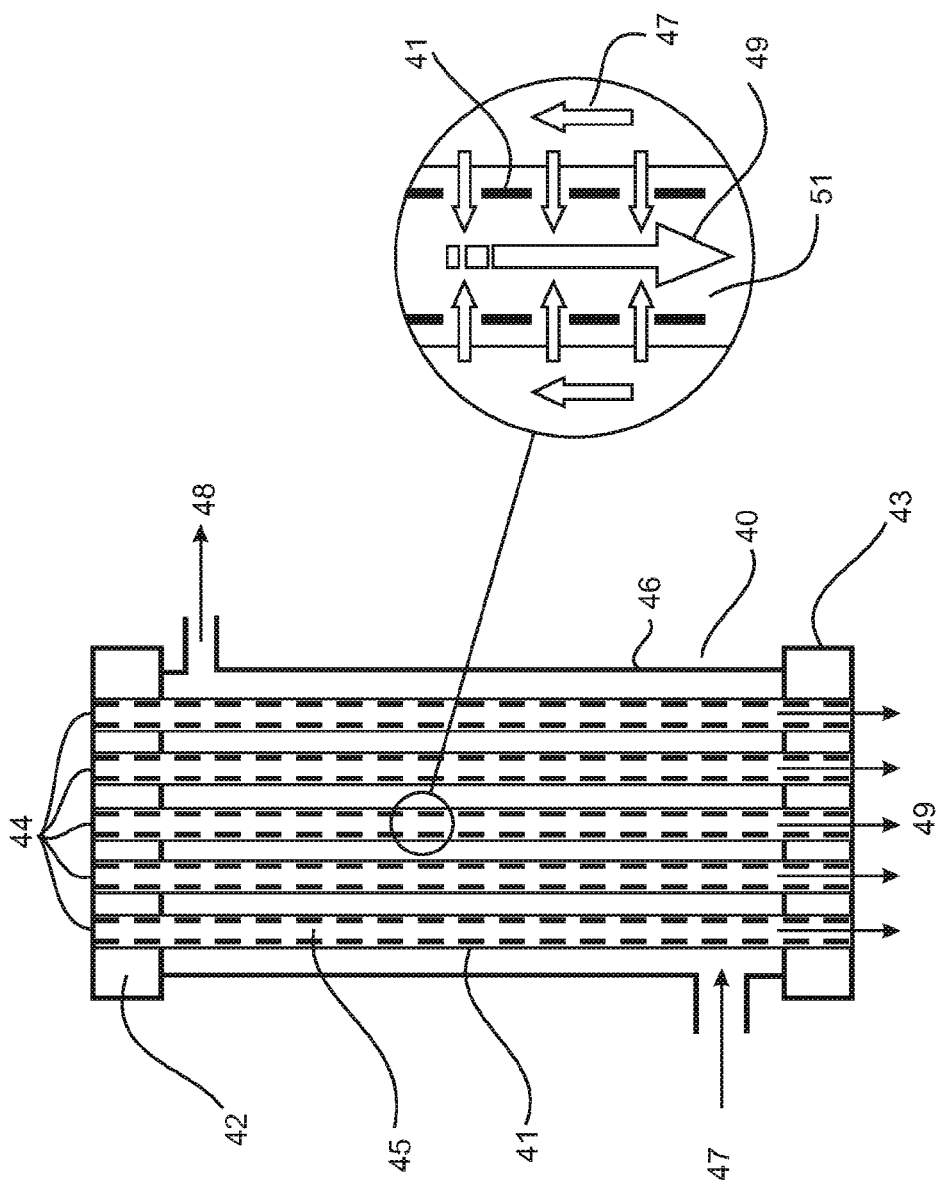
FIG. 2 is a schematic illustration of a typical hollow fibre membrane module.

The treated industrial stream 102 from the anaerobic digestion and settling stage, collectively forming the anaerobic reactor 12, requires aerobic digestion conditions to further treat the waste water. The flow 102 is directed from the anaerobic stage 12 into the MBR system 14 and thence to ultrafiltration ("UF") system 18 which includes a large number of hollow fibre membrane modules 40 as schematically illustrated in FIG. 2. Water treatment plant 100 may comprise a large number of such UF systems 16, 18 and several thousand membrane modules 40 for UF filtration of the wastewater. The resulting ultrafiltrate from UF system 16 and UF system 18 has nearly undetectable levels of Biochemical Oxygen Demand (BOD).

Figure 3:
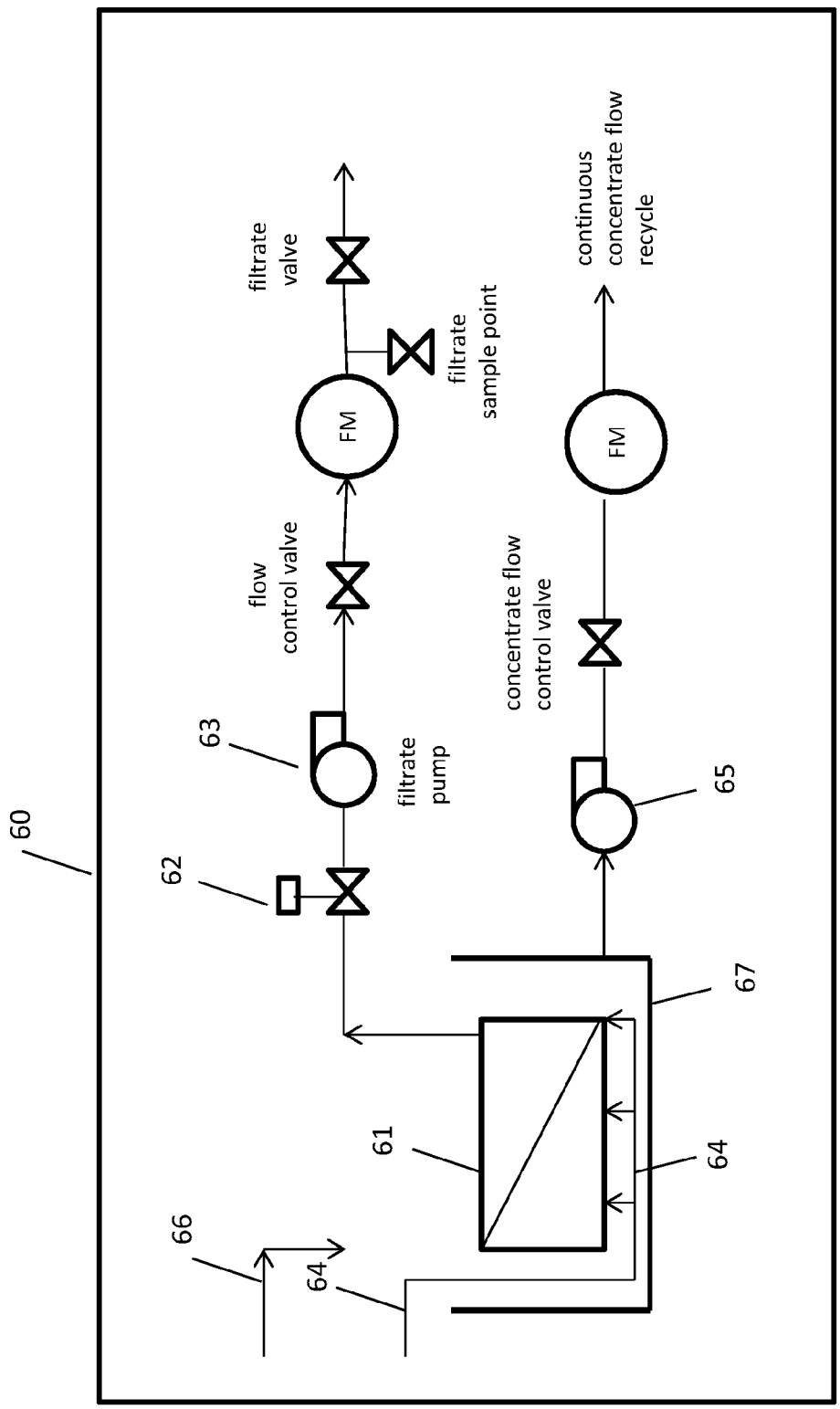
FIG. 3 is a schematic process flow diagram for a membrane separation plant including membrane bioreactors and operated in accordance with one embodiment of the present invention.

The UF module 40 depicted in FIG. 2 is but one example of the possible formats of UF that may be employed. Other possible UF module formats include open bundles of fibre where modules are all submerged together in a large agitated tank, as shown in FIG. 3.

Ultrafiltrate from wastewater stream 102 can be further processed by directing it from UF system 18 to nanofiltration process unit 20 for removing non biologically treatable Dissolved Organic Carbon (DOC) from the MBR filtrate to produce a water quality acceptable for feed to reverse osmosis ("RO") process unit 30. This is particularly suitable for treatment of filtrate originating from the industrial stream 102. The RO process unit 30 performs desalination and allows production of a water stream that may be recycled for a wide variety of high value uses including to a pulp and paper mill with benefit for the process economics of that mill.

Ultrafiltrate originating from the municipal influent stream 101 may be directed through disinfection process 19, typically involving ammonia and chlorine treatment to produce a water quality acceptable for feed to RO. The RO process unit 30 facilitates production of a water stream suitable for recycling, including directing the resulting water to a reservoir. The water may then be used, for example, in industrial processes such as, but not limited to, a pulp and paper mill. The ultrafiltrates from UF system 16 and 18 may also be directed to an outfall sewer and subsequently directed further as appropriate or as needed.

FIG. 2 shows a schematic, referenced at http://www.separationprocesses.com/Membrane/MT_FigGen15.htm, of one type of hollow fibre ultrafiltration ("UF") membrane module 40 suitable for use in the UF systems 16 and 18. UF membrane module 40 is of hollow fibre type comprising a bundle 44 of hollow fibre membranes 41 accommodated within a pressurisable housing 46. Bundle 44 extends between two vertically opposed headers or pots 42 and 43 forming part of the module housing 46. Headers 42 and 43 are of epoxy resin. The opposite ends of each hollow fibre membrane 41 of bundle 44 are embedded and sealed within headers 42 and 43 respectively. The resulting design of membrane module 40 is reminiscent of a shell and tube heat exchanger with feed mixed liquor 47 entering the housing 46 (shell side) contacting the hollow fibre membranes 41 with "clean" water, essentially free of BOD, permeating the membranes 41 to enter the lumens 45 of membrane fibres to be recovered as a permeate stream 49. Water relatively concentrated in filterable contaminants is recovered as a retentate stream 48. A similar filtration result is attainable using immersed membranes where the entire membrane module is submerged in mixed liquor and agitated with air and or recirculating flow of mixed liquor. In either case (pressurised or immersed) a layer of solids from the mixed liquor accumulates on the surfaces of hollow fibre membranes 41 during this membrane filtration process.

During conventional daily (24 hour duration) operation of membrane modules 40, the bundle 44 of hollow fibre membranes 41 is subjected to about 110 filtration cycles in which permeate 49 is recovered, whilst corresponding pump means are operated, by suction from the hollow fibre membranes 41. Therefore, each filtration cycle, which imposes the cyclic stress above described, has a duration of approximately 12 minutes. Following a filtration cycle, pump means is turned off during a relaxation cycle (of about 1 minute design duration). Sludge removal operations are conducted throughout the membrane operating cycle time, but particularly facilitated by the relaxation step, for example by agitating mixed liquor surrounding hollow fibre membranes 41, or air scouring, to shake the membranes and remove adherent sludge. The sludge so removed is typically carried away by a recirculation flow.

During operation of membrane modules 40, the solids accumulation on the membrane surfaces reduces permeate flux or if a given flux is maintained the trans membrane pressure (TMP), or filtration driving force, increases proportionately. A significant amount of solids accumulate on the surfaces of hollow fibres 41 during the 12 minute filtration cycle time. The growing quantity of accumulated solids increases creating an effect similar to concentration polarisation, as seen in reverse osmosis or electroplating processes, and results in less efficient membrane filtration due to increased filtration resistance.

FIG. 3 shows a schematic of UF system 60, which may form part of the operating UF systems 16 and/or 18 in water treatment plant 100. The UF system 60 is operated in accordance with a membrane separation process implemented to control the concentration polarisation analogue effect previously described and achieve more efficient filtration operation and hence improved water treatment. The UF system 60 is controlled by a PLC/SCADA control system.

As described above, domestic and industrial effluents are separately passed for treatment within the combined MBR system 14, and variously within this, are separately treated using aerobic digestion before filtration in UF systems 16 and 18.

UF system 60 illustrates the configuration of one UF cell within either UF operating system 16 or 18 in which UF membrane modules 40 are submerged while conducting the membrane separation process.

Filtrate pump 63 operates to produce a suction effect upon the liquid contained in membrane modules 61. This suction causes filtrate to flow towards the pump 63 drawing additional filtrate through UF fibres contained within membrane modules 61. Normal operation, as per the current art, is to continue this action for about 12 minutes before switching off pump 63 and waiting around 1 minute while air agitation 64 and recirculation flow caused by second pump 65 and delivered back into membrane tank 67 along with feed flow 66 dislodges accumulated dirt that has built up around the filtration fibres.

Provided pump 63 is operated so as to on draw a modest flux through the modules 61, and as long as agitation air 64 and recirculation are maintained, semi-continuous operation is permitted potentially for many weeks before cleaning of the membrane filter modules is required. Other factors, notably physico-chemical-biological characteristics of the mixed liquor itself can also play an important role in the rate of fouling accumulation. The combined outcome in the current art is that relatively modest fluxes are necessary to prevent unacceptable rates of loss of filtration efficiency. This is especially a problem with certain types of industrial wastewaters, such as from oil refineries and pulp and paper mills where the character of the wastewater can create biological conditions that lead to slimes or a high concentration of very fine particles.

The present invention deals with this problem as follows. During operation of filtrate pump 63, fast acting valve 62 is opened and closed such that filtrate flow stops and starts many times per minute. This ensures that recirculation flow created by second pump 65 and agitation air 64 are able to more efficiently remove material accumulating on the surface of the membrane fibres in filtration modules 61.

This novel operating arrangement permits continuous operation at an average flux up to double or even three times the flux that can be maintained if the typical long filtrate cycle system is used.

This method of flux enhancement does not entail any basic modification to the UF filtration module and the flux enhancement achieved by the present invention has been best observed when UF operation is practiced in a feed water with a high propensity to cause rapid fouling. If filtration of pure water were to be performed, where no solids accumulation would be expected (since no solids are present), no improvement in filtration performance is anticipated.

In this novel arrangement, duration of the filtration and relaxation cycles are adjustable independently of the filtrate pump 63. For example, valve 62 may be alternately open then closed for intervals of 10 seconds. This cycle duration is purely by way of example but it is very significantly and unconventionally less than the about 13 minute total duration of filtration and relaxation cycles during typical service of modules that might be found in UF systems 16 and 18 of the water treatment plant 100. Consequently, the frequency of filtration and relaxation cycles in membrane modules 61 is accelerated to a frequency being very significantly and unconventionally greater than during conventional service of UF systems 16 and 18 of water treatment plant 100. The result is that solids accumulate at the membrane surface to a significantly lesser degree than in conventional practice. Concentration polarisation is significantly less and permeate flux and/or TMP are maintained in a higher target range than is possible in a slow filtration cycle UF system.

At the completion of the shortened filtration cycle, solenoid valve 62 will close and mixed liquor will filtrate will cease flowing into the UF fibres, meaning that agitation air 64 and recirculation flow through pump 65 can remove trapped material that has accumulated at the membrane fibre surface. During the relaxation cycle filtrate pump 63 operates at the same speed as during the filtration cycle. A different speed control program for filtrate pump 63 could be adopted. However, when there are many modules 61 mounted within a single module tank 67 the valve 62 is also replicated such that there is one valve 62 per rack of modules. Each of these valves 62 are opened and closed sequentially such that a constant net filtrate flow passes through filtrate pump 63. This removes the need for filtrate pump 63 to be continuously started and stopped as typically occurs in the current art.

The speed of actuation of valve 62 can be controlled such that pressure shocks can be prevented, or deliberately provoked. In cases where a pressure shock is produced intentionally, the consequential brief reverse flow pulse can be used to further reduce solids accumulation at the membrane surface, thereby achieving lower concentration polarisation, better filtration efficiency and counter-intuitively longer life for membrane modules 40.

Operation of MBR system 14 with very short durations for the filtration and relaxation cycles achieves a number of benefits. First, solids accumulation, fouling and concentration polarisation is reduced. Second, as there is less fouling, usage of cleaning chemicals is lowered. Less intense air scouring may also be used or perhaps avoided. These benefits achieve improved water treatment plant economics, by reducing capital and operating costs and enabling increased throughput for a given quantity of membranes.

Modifications and variations to the membrane separation process described in this specification may be apparent to the skilled reader of this disclosure. Such modifications and variations are deemed within the scope of the present invention.

The invention claimed is:

1. A membrane separation process comprising pumping of a fluid stream through at least one membrane module, each comprising at least one membrane, to produce a permeate during a plurality of membrane operating cycles, each membrane operating cycle comprising a filtration cycle and a relaxation cycle wherein membrane concentration polarization is controlled during the process by controlling duration of filtration cycles and relaxation cycles to maintain a degree of concentration polarization below a target;

wherein the target for the degree of concentration polarization is set at least partly with reference to one or more of: permeate flux in a constant pressure operation, trans membrane pressure, or accumulation of solids on membrane surfaces;

wherein the membrane operating cycle duration is less than 30 seconds, and changes between the filtration cycles and relaxation cycles are controlled at least in part by valve operation; and wherein no air scouring of the surface of the at least one membrane of each module is induced during the membrane operating cycles.

2. A membrane separation process according to claim 1 wherein the duration of the filtration and relaxation cycles is set at least in part by reference to solids accumulation.

3. A membrane separation process according to claim 2, wherein the step of pumping of a fluid stream comprises pumping the fluid stream through a plurality of membrane modules in a rack of membrane modules, and wherein solids accumulation is measured by or with reference to one or more of: thickness of surface layer, trans-membrane pressure, permeate flux or gross solids load accumulated on the rack of membrane modules.

4. A membrane separation process according to claim 1, wherein permeate is extracted through the at least one membrane at a flux approaching hydraulic capacity of a system comprising the at least one membrane module.

5. A membrane separation process according to claim 1, wherein the duration of at least one of the filtration cycles and the relaxation cycles are varied at least in part in response to changes in effluent water composition or characteristics.

6. A membrane separation process according to claim 1, wherein the permeate is drawn through the at least one membrane by suction.

7. A membrane separation process according to claim 6, wherein the suction is generated by one or more extraction pumps located downstream of the at least one membrane.

8. A membrane separation process according to claim 7, wherein the filtration and relaxation cycles have filtration and relaxation cycle times which are controlled with valve operation.

9. A membrane separation process according to claim 7, wherein the one or more extraction pumps run substantially continuously during the membrane operating cycles.

10. A membrane separation process according to claim 7, wherein the filtration and relaxation cycles have filtration and relaxation cycle times which are adjustable independently of the one or more pumps.

11. A membrane separation process according to claim 1, wherein each of the at least one membrane modules comprise hollow fiber membranes.

\* \* \* \* \*